United States Patent
Hélot

(10) Patent No.: US 12,441,237 B2
(45) Date of Patent: Oct. 14, 2025

(54) MOTOR VEHICLE LIGHTING DEVICE WITH A PLURALITY OF LIGHT SOURCES WITH RESPECTIVE PAIRED COVER SEGMENTS WHICH CAN BE SWITCHED SO AS TO BE OPAQUE; MOTOR VEHICLE; AND METHOD

(71) Applicant: Audi AG, Ingolstadt (DE)

(72) Inventor: Jacques Hélot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/265,319

(22) PCT Filed: Oct. 22, 2021

(86) PCT No.: PCT/EP2021/079310
§ 371 (c)(1),
(2) Date: Jun. 5, 2023

(87) PCT Pub. No.: WO2022/117256
PCT Pub. Date: Jun. 9, 2022

(65) Prior Publication Data
US 2024/0198899 A1    Jun. 20, 2024

(30) Foreign Application Priority Data
Dec. 3, 2020  (DE) ................. 10 2020 132 098.1

(51) Int. Cl.
*B60Q 3/66* (2017.01)
*B60Q 3/78* (2017.01)

(52) U.S. Cl.
CPC . *B60Q 3/66* (2017.02); *B60Q 3/78* (2017.02)

(58) Field of Classification Search
CPC ........ B60Q 3/78; B60Q 3/66; F21W 2106/00; G02F 1/133601; G02F 1/133607; G02F 1/133603
See application file for complete search history.

(56) References Cited

U.S. PATENT DOCUMENTS 6,160,475 A * 12/2000 Hornung ................. B60Q 3/78
340/461
10,940,759 B2    3/2021 Helot
(Continued)

FOREIGN PATENT DOCUMENTS

DE        3031126 A1    4/1982
DE      10021984 A1   11/2001
(Continued)

OTHER PUBLICATIONS

English Machine Translation of DE 102017212657 provided by ESPACENET (Year: 2017).*
(Continued)

Primary Examiner — Zheng Song
(74) Attorney, Agent, or Firm — Sterne, Kessler, Goldstein &Fox P.L.L.C.

(57) ABSTRACT

The present disclosure relates to a motor vehicle lighting device comprising a lighting element with a plurality of light sources and a cover element which is designed to change between a transparent operating state and an opaque operating state. In order to allow an improved display of contours on a motor vehicle lighting device, the cover element has a plurality of cover segments, wherein each cover segment can be actuated individually with respect to the transparent and opaque operating state, and the motor vehicle lighting device has a light guiding element, said light guiding element being designed such that light emitted by the plurality of light sources is guided from a plurality of first coupling surfaces, at which the light guiding element is optically coupled to each of the light sources, to a plurality of second coupling surfaces, at which the light guiding element is optically coupled to each of the cover segments, each of the second coupling surfaces than bigger than the first coupling surfaces.

17 Claims, 3 Drawing Sheets

(56) References Cited

U.S. PATENT DOCUMENTS

| | | | |
|---|---|---|---|
| 11,754,242 B2* | 9/2023 | Gloss | F21S 43/26211 |
| | | | 362/459 |
| 2004/0023034 A1 | 2/2004 | Schmidt et al. | |
| 2012/0091923 A1* | 4/2012 | Kastner-Jung | F21S 10/02 |
| | | | 313/512 |
| 2017/0174125 A1* | 6/2017 | Katsurayama | G02B 6/0006 |
| 2018/0326900 A1 | 11/2018 | Chen et al. | |
| 2019/0168666 A1* | 6/2019 | Nomura | B60Q 9/007 |
| 2019/0308552 A1* | 10/2019 | Dominick | B60K 35/60 |
| 2020/0130572 A1* | 4/2020 | Franke | B60Q 3/78 |
| 2020/0363034 A1* | 11/2020 | Nykerk | F21S 41/645 |
| 2020/0400281 A1* | 12/2020 | Nykerk | F21S 41/25 |
| 2020/0408382 A1* | 12/2020 | Kleijnen | F21S 4/22 |
| 2021/0188164 A1* | 6/2021 | Tontsch | B60K 35/60 |
| 2022/0107073 A1* | 4/2022 | Nykerk | F21S 41/147 |

FOREIGN PATENT DOCUMENTS

| | | |
|---|---|---|
| DE | 10031294 A1 | 1/2002 |
| DE | 102017212657 A1 | 11/2018 |
| DE | 102017212912 A1 | 1/2019 |

OTHER PUBLICATIONS

International Search Report and Written Opinion of the International Searching Authority directed to related International Patent Application No. PCT/EP2021/079310, mailed Feb. 2, 2022, with attached English-language translation; 16 pages.

International Preliminary Report on Patentability directed to related International Application No. PCT/EP2021/079310, mailed on Jul. 28, 2022, with attached English-language translation; 14 pages.

* cited by examiner

MOTOR VEHICLE LIGHTING DEVICE WITH A PLURALITY OF LIGHT SOURCES WITH RESPECTIVE PAIRED COVER SEGMENTS WHICH CAN BE SWITCHED SO AS TO BE OPAQUE; MOTOR VEHICLE; AND METHOD

TECHNICAL FIELD

The present disclosure relates to a motor vehicle lighting device with a lighting element with a plurality of light sources as well as a cover element, which is formed to change between a transparent and an opaque operating state. In addition, the present disclosure relates to a motor vehicle with such a motor vehicle lighting device as well as to a method for operating such a motor vehicle lighting device.

BACKGROUND

Electrically switchable foils and/or glasses, which can be switched between a transparent or clear and an opaque operating state, are known from the prior art. For example, DE 100 31 294 A1 as well as DE 100 21 984 A1 each disclose a composite foil with electrically switchable optical characteristics including a suspension of electrophoretically mobile particles situated between two electrodes, wherein the suspension exhibits a negative electro-rheological effect. The composite foils can be used for producing flat screens, watches, display panels or computers.

DE 30 31 126 A1 describes a device for presenting images of multiple image segments, with a preferably plate-shaped body, which is composed of a transparent support material with a refractive index of greater than 1 and contains fluorescent particles, wherein two transparent electrodes as well as a liquid crystal layer electrically switchable between two optically different states are arranged on the one side of the fluorescent body, namely each in the area of one of the image segments. In addition, the printed matter shows that the two electrodes of each image segment are located in a plane situated between the fluorescent body and the liquid crystal layer and together form an interdigital structure, and that the liquid crystal layer is composed of a solid polymer with switchable mesogenic constituents.

With respect to a motor vehicle, DE 10 2017 212 912 A1 shows a display device comprising: a first, extensive display element, which is arranged in a first display plane of the display device, and at least one further, extensive display element, which is respectively arranged in a further display plane of the display device and is arranged in front of the first display element in a viewing direction of a user. The at least one further display element forms a multi-layered combination of display elements with the first display element, wherein the at least one further display element each comprises an at least partially transparent display surface and each one sight protection element for adjusting a degree of transparency at least of an area of the display element.

For illuminating an interior, a motor vehicle lighting device formed as a light band is for example provided in novel motor vehicles. Such a motor vehicle lighting device or such a light band is for example arranged at a windscreen root of the motor vehicle, thus between windscreen and dashboard. Such a motor vehicle lighting device or such a light band can extend at least substantially across the entire area between two A-pillars of the motor vehicle. In particular, the light band is designed as a LED light band. Such a lighting band can also be accommodated in the switchboard, in the doors, the floor, roof or in the pillars.

In the today's light bars, multiple colors can be presented. However, if two colors are presented next to each other, thus, there is always a color gradient between the colors. This does not look precisely. Or, if an area of the light bar is on and an area is off, there is a brightness gradient at the boundary between the areas.

BRIEF DESCRIPTION OF DRAWINGS/FIGURES

DETAILED DESCRIPTION

Figure 1:
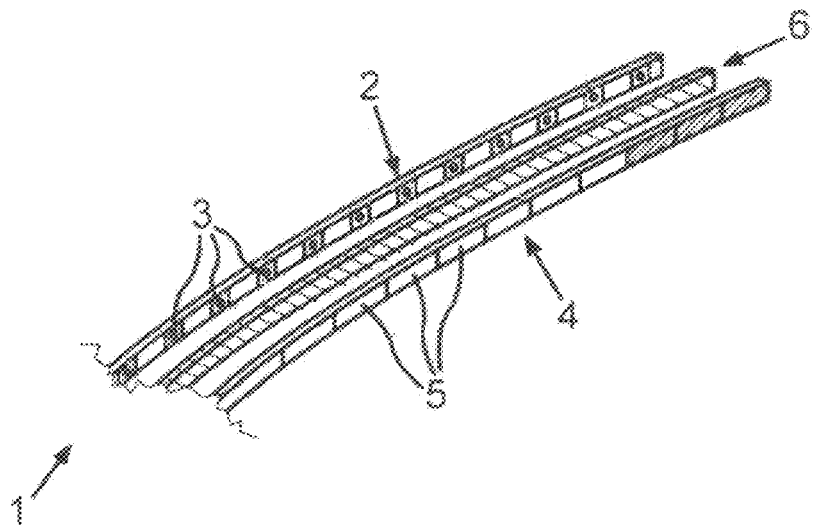
FIG. 1 illustrates an exemplary motor vehicle lighting device.

It is the object of the present disclosure to allow an improved presentation of contours at such a motor vehicle lighting device. In addition, it is the object to allow a clear separation between switched-on and switched-off areas and/or between different color areas.

According to the present disclosure, this object is solved by the subject matters of the independent claims. Advantageous embodiments with convenient developments are the subject matter of the dependent claims.

A first aspect relates to a motor vehicle lighting device with a lighting element with a plurality of light sources and a cover element, which is formed to change between a transparent and an opaque operating state.

According to the present disclosure, it is provided that the cover element comprises a plurality of cover segments, wherein each of the cover segments can be individually actuated with respect to the transparent and opaque operating state, and the motor vehicle lighting device comprises a light guiding element, wherein the light guiding element is formed to guide light emitted by the light sources of the plurality from a plurality of first coupling surfaces, at which the light guiding element is optically coupled to each one of the light sources, to a plurality of second coupling surfaces, at which the light guiding element is optically coupled to each one of the cover segments, wherein the second coupling surfaces are each larger than the first coupling surfaces.

In particular, the lighting element can be a light band. The lighting element can comprise a plurality of LEDs or light emitting diodes as the light sources. In other words, the light sources can be provided by each one or more LEDs or light emitting diodes. Of course, any other design of light sources, for example by halogen illuminants, incandescent lamps and/or fluorescent lamps or gas discharge lamps, is also possible. The lighting element or the light sources can be designed unicolored or multicolored. In other words, the light sources can each be formed to emit light of exactly one color or light of multiple colors. Therein, a color in terms of the present application can also be composed of light of different spectral ranges, such as for instance in case of white light.

For example, the cover element can be provided by a switchable foil or a so-called intelligent foil (e.g. a PDLC foil) and/or a so-called switchable or intelligent glass. Therein, the cover element is individually switchable in each of the cover segments. In other words, the cover element allows that the respective cover segments each can be transferred or are transferable into the transparent and the opaque operating state independently of each other. Hereto, it can for example be provided that the individual cover segments are electrically insulated from each other at least in certain areas. By such an electrical insulation, a respectively different electrical potential can be applied to the cover segments. In other words, the cover segments allow the application of a respectively different electrical potential by the respective electrical insulation from each other in this case.

The operating state of the cover element or the cover segments can in particular be dependent on the respective applied electrical potential. In other words, the cover element can be switched from the transparent into the opaque operating state or from the opaque operating state into the transparent operating state by applying a respective voltage or a respective electrical potential. By applying a respective electrical voltage or a respective electrical potential, molecules of the cover element or of the respective cover segments can be oriented. Corresponding to the orientation of the molecules, in particular long-chain organic molecules, the cover element or the cover segments thereof can be transparent and clear, respectively, or opaque.

It can be provided that each of the cover segments comprises a respective or two respective electrodes. The respective electrodes of the cover segments can be electrically insulated from each other. In this manner, the application of a respectively different voltage to the electrodes is allowed. For example, each of the cover segments can comprise two respective electrodes, which are both electrically insulated from the electrodes of the remaining cover segments. Alternatively, the cover element can comprise a common first electrode, which forms a common electrode of all of the cover segments. In this manner, the cover segments can have the same electrical potential on a first side. The respective voltage on the cover segments can then be presettable by the electrical potential of a respective second electrode of the cover segments. Therein, the second electrodes are in particular each electrically insulated from each other. By such a design, the independent switchability of each of the cover segments is ensured on the one hand, a construction of the cover element or the cover segments with low effort can be allowed on the other hand.

In particular, it is provided that the cover element overlaps the lighting element in the direction of a main emission direction of the lighting element or of the plurality of light sources. In particular, it is provided that the cover element or the cover segments completely or at least substantially completely overlap the lighting element or the plurality of light sources in the direction of the main emission direction. In this manner, a light emission of the light sources or of the lighting element along the main emission direction can be influenced by switching the cover element or the cover segment between the transparent and opaque operating state. Therein, in particular that direction is referred to as main emission direction, into which an emission of light by the lighting element or the light sources is provided as intended. In particular, the predominant portion of the light emitted by the lighting element or the light sources is emitted along the main emission direction.

Advantageously, it is provided that the cover element overlaps all of the light sources in the direction of the main emission direction of the motor vehicle lighting device. In particular, it is provided that each of the light sources is overlapped by at least one cover segment of the cover element in the direction of the main emission direction of the corresponding light source. In this manner, the light emission of each light source can be individually influenced or capable of being influenced by corresponding actuation of the corresponding cover segment. For example, it can be provided that each of the cover segments is formed to influence light emitted by one, in particular exactly one, of the light sources along the main emission direction by changing between the transparent and the opaque operating state. Herein, a one-to-one association particularly advantageously results. This for example means that exactly one respective cover segment is associated with each of the light sources and/or exactly one of the light sources is associated with each of the cover segments.

Overall, it becomes apparent how an emission of light by the motor vehicle lighting device with the design according to the present disclosure of the cover element or the cover segments can be particularly advantageously influenced. In particular, it is possible to adjust sharp and/or soft contours along the light sources by the segmented cover element. Thus, a further degree of freedom in influencing the light emission of the motor vehicle lighting device arises, namely the actuation of the individual cover segments, in addition to the actuation of the plurality of light sources or of the lighting element. Thus, a clear separation between switched-on and switched-off areas arises. Areas, which shine with different colors, can also be clearly separated, however, there is locally no color on the separation between the areas of different color by the opacity of the foil. Thus, the color strip is interrupted where the colors differ.

According to a development, it is provided that the light sources are linearly arranged, wherein each light source is in particular arranged adjacent to at most two light sources. In other words, the light sources can be single-row arranged. Accordingly, the motor vehicle lighting device is preferably designed elongated. In particular, the motor vehicle lighting device can therein linearly extend between the A-pillars, in particular along the windscreen root, as introductorily described. By such an elongated design, the possibility of generating particular light effects, for example along the main extension direction of the linear motor vehicle lighting device, in particular arises. Together with the segmented cover element, the possibility of individually actuating individual segments along the line shape results therefrom. Optionally, each light source of the plurality of light sources is arranged adjacent to at most two other light sources of the plurality of light sources. In this manner, a particularly sharp, linear course of the motor vehicle lighting device can be realized. In this manner, a presentation content can be further improved together with the segmented design of the cover element.

According to a development, it is provided that the light guiding element is arranged between the plurality of light sources and the cover element. In other words, the light guiding element can be spatially arranged between the light sources and the cover element. For example, the plurality of light sources or the lighting element is arranged on a first side of the light guiding element and the cover element is arranged on a second side of the light guiding element facing away from or opposite to the first side. The light guiding element and the cover element can be successively arranged along the main emission direction. In this manner, a particularly homogeneous light distribution can be generated since the light refraction in the light guiding element is not disturbed by the cover element. Rather, cover or control of the emitted light is only effected after exit thereof from the light guiding element by the cover element.

According to a development, it is provided that the cover element is laminated onto a protective element. The protective element can be a glass or a transparent plastic. By the protective element, the cover element can be protected from environmental influences. In particular, the cover element is applied or laminated onto a side of the protective element facing away from an observer. In other words, the cover element can be applied or laminated onto a side of the protective element facing the lighting element.

According to a development, it is provided that the light guiding element is at least formed of a non-transparent and/or opaque, but translucent material. In particular, it is provided that the light guiding element is formed of a material, which is translucent, but not transparent. In other words, the material can be non-transparent. In this manner, a particularly uniform distribution of the light emitted by the light source arises within the light guiding element. A particularly homogeneous light emission without shining through of the individual light sources is allowed.

According to a development, the motor vehicle lighting device comprises a common circuit board and/or a common cable harness, wherein the light sources and the cover segments, respectively, can be actuated by the common circuit board and the common cable harness, respectively. In particular, the light sources as well as the cover segments can each be contacted with a control unit via the same common circuit board and the same common cable harness, respectively. For example, the motor vehicle lighting device comprises a con-tact pad, from which the light sources as well as the cover segments are electrically contacted via the common circuit board and/or the common cable harness. In this manner, a particularly compact appearance of the motor vehicle lighting device can be allowed. On the other hand, a particularly simple capability of actuation is allowed.

A second aspect relates to a motor vehicle with the motor vehicle lighting device according to the present disclosure. Therein, the motor vehicle lighting device is preferably arranged at a motor vehicle interior equipment of the motor vehicle. For example, the motor vehicle interior equipment is a dashboard, the windscreen root of the windscreen, an elongated trim edge, a center console and/or a door interior trim. However, an application at the dashboard, in particular along the windscreen root, is preferred therein.

The motor vehicle according to the present disclosure is preferably configured as a car, in particular as a passenger car or truck, or as a passenger bus or motorcycle.

According to a development, it is provided that the motor vehicle lighting device extends at the motor vehicle interior equipment at least across 70 percent of a width of the motor vehicle. In other words, a length of the motor vehicle lighting device is for example 70 percent of the width of the motor vehicle or more. Therein, the motor vehicle lighting device is in particular arranged at the motor vehicle interior equipment at least across 70 percent of the width of the motor vehicle. For example, the motor vehicle lighting device thus extends along both A-pillars of the motor vehicle across at least 70 percent of the width of the motor vehicle. In this case, the motor vehicle lighting device is in particular linearly or elongated designed as already described above. In particular, the motor vehicle lighting device can be integrally designed with respect to the light sources in this example too. However, the present disclosure is independent of the length of the light guide. The band between A-pillars is only an exemplary embodiment of the idea.

A third aspect relates to a corresponding method for operating a motor vehicle lighting device, wherein the motor vehicle lighting device comprises a lighting element with a plurality of light sources and a cover element, which is formed to change between a transparent and an opaque operating state.

The method comprises the following steps:
individually actuating a plurality of cover segments of the cover element with respect to the transparent and opaque operating state, and
guiding light emitted by the light sources by a light guiding element from a plurality of first coupling surfaces, at which the light guiding element is optically coupled to each one of the light sources, to a plurality of second coupling surfaces, at which the light guiding element is optically coupled to each one of the cover segments, wherein the second coupling surfaces are each greater than the first coupling surfaces.

A control device for the motor vehicle lighting device also belongs to the present disclosure. The control device can comprise a data processing device or a processor device, which is configured to perform an embodiment of the method according to the present disclosure. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise a program code, which is configured, upon execution by the processor device, to perform the embodiment of the method according to the present disclosure. The program code can be stored in a data memory of the processor device.

Developments of the method according to the present disclosure, which comprise features as they have already been described in context of the developments of the motor vehicle lighting device according to the present disclosure and/or of the motor vehicle according to the present disclosure, also belong to the present disclosure. For this reason, the corresponding developments of the method according to the present disclosure are not again described here.

The present disclosure also includes the combinations of the features of the described embodiments. Thus, the present disclosure also includes realizations, which each comprise a combination of the features of multiple of the described embodiments if the embodiments have not been described as mutually exclusive.

In the following, embodiments of the present disclosure are described. The embodiments explained in the following are preferred embodiments. In the embodiments, the described components of the embodiments each represent individual features of the present disclosure to be considered independently of each other, which also each develop the present disclosure independently of each other. Therefore, the disclosure also is to include combinations of the features of the embodiments different from the illustrated ones. Furthermore, the described embodiments can also be supplemented by further ones of the already described features of the present disclosure.

In the figures, identical reference characters each denote functionally identical elements.

Figure 4:
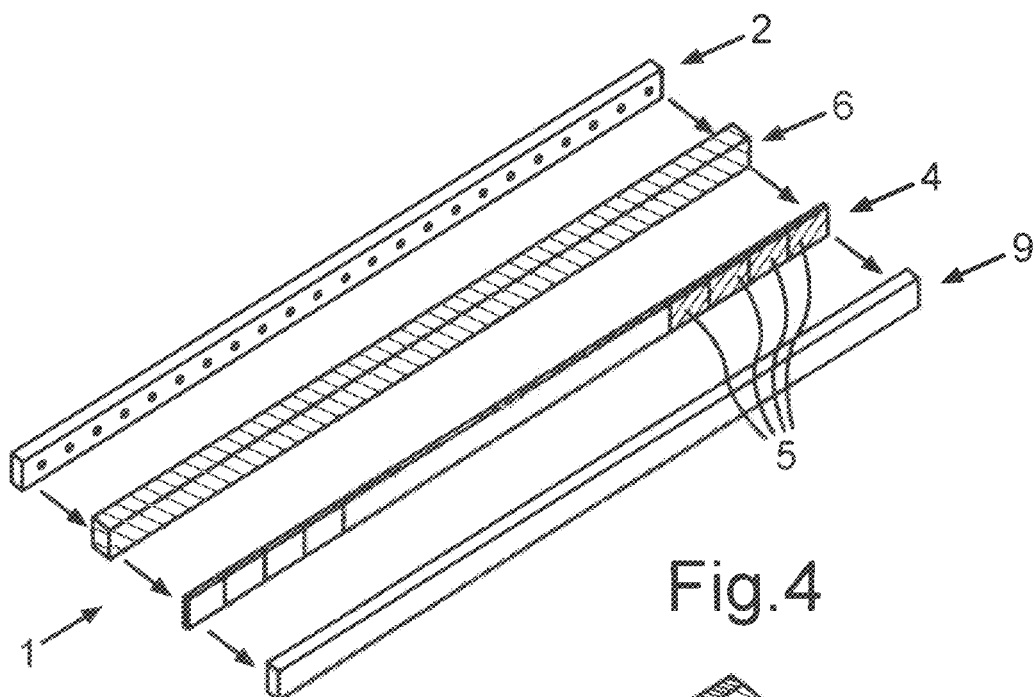
FIG. 4 illustrates a further exemplary motor vehicle lighting device.

FIG. 1 illustrates a motor vehicle lighting device 1 in an exploded perspective view. FIG. 4 illustrates a further embodiment of the motor vehicle lighting device 1 in an exploded view. The motor vehicle lighting device 1 comprises a lighting element 2, a cover element 4 as well as a light guiding element 6. Therein, the light guiding element 6 can be designed as a strip with a certain thickness. In its dimensions, the light guiding element 6 can correspond to the cover element 4 along a surface, but have a larger thickness, but with a little thickness, say 10 mm. The lighting element 2 is arranged on a first side of the light guiding element 6. The cover element 4 is arranged on a second side of the light guiding element 6 facing away from or opposite to the first side of the light guiding element 6. The lighting element 2 is formed to emit light. The lighting element 2, the light guiding element 6 and the cover element 4 are preferably successively arranged along a main emission direction of the light emitted by the lighting element 2. Thus, the light emitted by the lighting element 2 preferably first impinges on the light guiding element 6. That portion of the said light, which transmits the light guiding element 6, subsequently impinges on the cover element 4. In particular, the light guiding element 6 is continuous along the main extension direction of the motor vehicle lighting device 1, in particular, there are no chambers, which divide the light guiding element 6.

The lighting element 2 comprises a plurality of light sources 3. In particular, the lighting element 2 can be a light band. The lighting element 2 can comprise a plurality of LEDs or light emitting diodes as the light sources 3. In other words, the light sources 3 can be provided by each one or more LEDs or light emitting diodes. Of course, any other design of light sources 3, for example by halogen illuminants, incandescent lamps and/or fluorescent lamps or gas discharge lamps, is also possible. The lighting element 2 or the light sources 3 can be designed unicolored or multicolored. In other words, the light sources 3 can each be formed to emit light of one wavelength or light of multiple wavelengths.

The cover element 4 can for example be provided by a switchable foil or a so-called intelligent foil and/or a so-called switchable or intelligent glass. The cover element 4, thus in particular the switchable foil, is presently laminated onto a protective element 9. The protective element 9 can be formed by a glass support or of glass or a transparent plastic. The switchable foil of the cover element 4 is sensitive, therefore, the glass or transparent plastic should be directed to the outside. Then, the protective element 9 can satisfy a dual benefit and impart a certain stiffness for better processing and stability to the cover element 4 on the one hand and protect the cover element 4 from environmental influences on the other hand. Therein, the cover element 4 is divided into a plurality of cover segments 5. The cover segments 5 are in particular each switchable between an opaque operating state and a transparent operating state independently of each other. In other words, the cover element 4 is individually switchable in each of the cover segments 5. In still other words, the cover element 4 allows that the respective cover segments 5 each can be transferred or are transferable into the transparent and the opaque operating state independently of each other. Hereto, it can for example be provided that the individual cover segments 5 are electrically insulated from each other at least in certain areas. By such an electrical insulation 9, a respectively different electrical potential can be applied to the cover segments 5. In other words, the cover segments 5 allow the application of a respectively different electrical potential by the respective electrical insulation 9 from each other in this case. In particular, the electrical insulation 9 interrupts the cover element 4 and/or divides it into the individual cover segments 5.

The light guiding element 6 is at least formed of a non-transparent and/or opaque, but translucent material. In particular, it is provided that the light guiding element 6 is formed of a material, which is translucent, but not transparent. In other words, the material can be non-transparent. In this manner, a particularly uniform distribution of the light emitted by the light source results within the light guiding element 6. A particularly homogeneous light emission without shining through of the individual light sources 3 is allowed.

Presently, each of the light sources 3 is coupled to the light guiding element 6 via a respective first coupling surface. Each of the cover segments 5 is coupled to the light guiding element 6 via a respective second coupling surface. The respective light sources 3 can be formed to couple light exclusively into the light guiding element 6 via the first coupling surface. Advantageously, the lighting element 2 with the light sources 3, the light guiding element 6 and the cover element 4 with the cover segments 5 are successively arranged along the main emission direction of the light sources 3 in this order. Therein, the lighting element 2 with the light sources 3, the light guiding element 6 and the cover element 4 with the cover segments 5 at least substantially completely mutually overlap along the main emission direction in the present embodiment.

Figure 2:
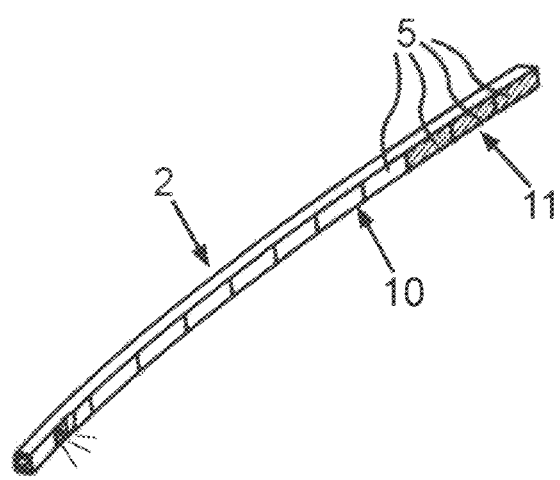
FIG. 2 illustrates the motor vehicle lighting device in a first exemplary operating state.
Figure 3:
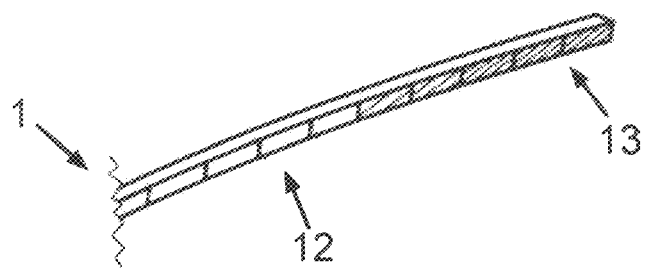
FIG. 3 illustrates the motor vehicle lighting device in a second exemplary operating state.

FIGS. 2 and 3 illustrate, how an emission of light by the motor vehicle lighting device 1 can be particularly influenced by the cover of the light sources 3 and of the light guiding element 6 by the cover segments 5. In particular, it is possible to adjust sharp (FIG. 2) and/or soft (FIG. 3) contours along the light sources 3 by the segmented cover element 4. This is allowed by respective actuation of the cover segments 5 with respect to their opacity and transparency and/or translucency, respectively. By a corresponding course of the opacity and transparency and/or translucency, respectively, of the cover segments 5 along the linear course of the motor vehicle lighting device 1, different effects can be achieved. Thus, a further degree of freedom in influencing the light emission of the motor vehicle lighting device arises, namely the actuation of the individual cover segments, in addition to the actuation of the plurality of light sources or of the lighting element.

FIG. 2 exemplarily shows, how the cover segments 5 of a first length area 10 and a second length area 11 of the motor vehicle lighting device 1 are binary differently actuated with respect to their opacity and transparency and/or translucency, respectively. Hereby, a sharp edge arises at the transition between the first length area 10 and the second length area 11. The cover segments 5 of the first length area 10 have a lower opacity and a higher transparency and/or translucency, respectively, than the cover segments 5 of the second length area 11 due to their switching state. Inversely, the cover segments 5 of the second length area 11 presently have a higher opacity and a lower transparency and/or translucency, respectively, than the cover segments 5 of the first length area 10 due to their switching state. Therein, the respective switching state is in particular dependent on the respectively applied voltage on the cover segments 5.

FIG. 3 exemplarily shows, how the cover segments 5 are increasingly differently actuated from a first side 12 of a transition and a second side 13 of the transition with respect to their opacity and transparency and/or translucency, respectively. Hereby, the continuous, soft transition between the first side 12 and the second side 13 arises. Starting from the first side 12 towards the second side 13, the cover segments 5 have an increasing opacity and a decreasing transparency and/or translucency, respectively, due to their switching state. Inversely, starting from the second side 13 towards the first side 12, the cover segments 5 presently have a decreasing opacity and an increasing transparency and/or translucency, respectively, due to their switching state.

Figure 5:
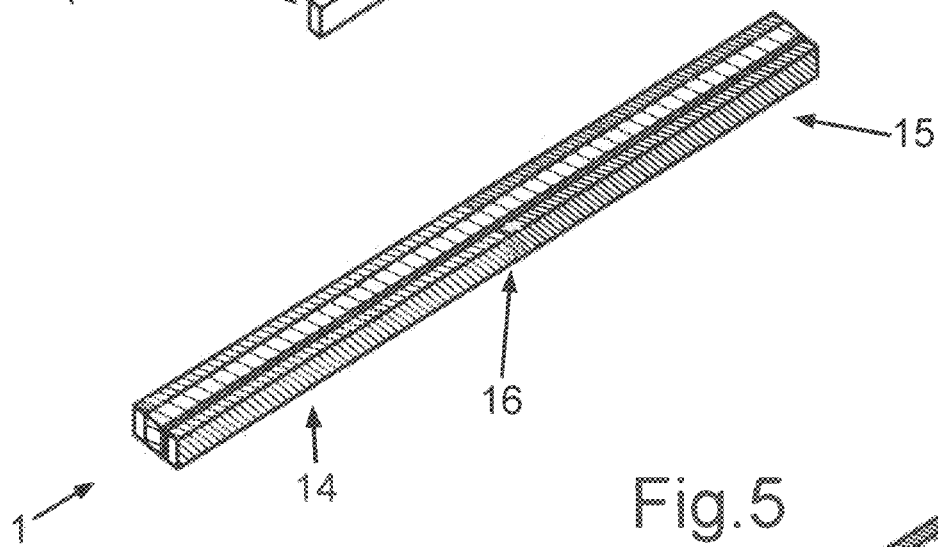
FIG. 5 illustrates the motor vehicle lighting device in a third exemplary operating state.

FIG. 5 exemplarily shows, how the respective light sources 3 of a first color area 14 and of a second color area 15 of the motor vehicle lighting device 1 are differently actuated with respect to their color without a corresponding actuation of the cover segments 5. The illuminants 3 of the first color area 14 for example shine green and the illuminants 3 of the second color area 15 for example shine red. Due to the light guiding element 6, a transition area 16 between the first color area 14 and the second color area 15 results. In the transition area 16, the different colors of both color areas 14, 15 mix due to the guidance of the light in the light guiding element 6.

Figure 6:
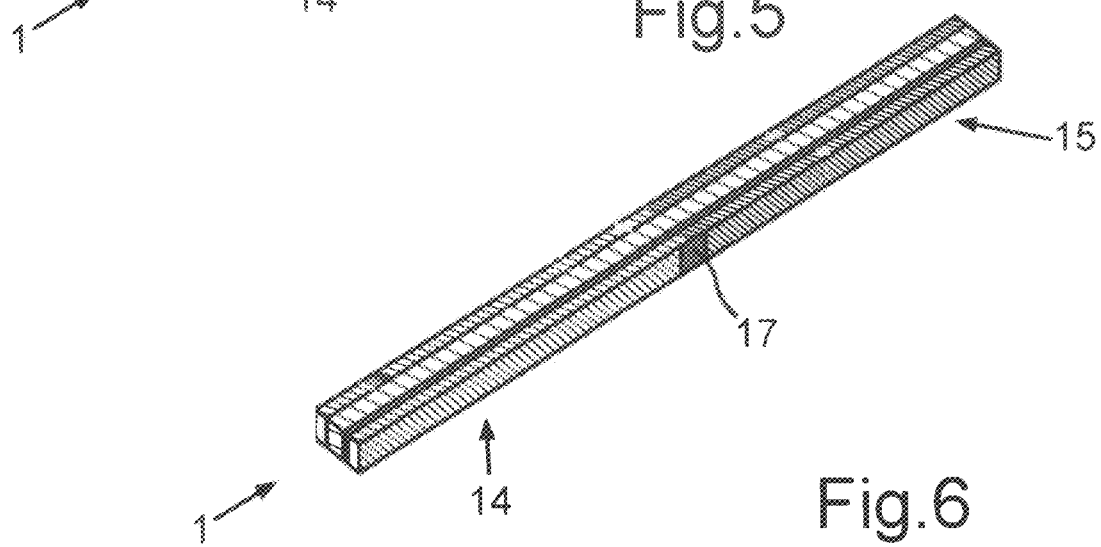
FIG. 6 illustrates the motor vehicle lighting device in a fourth exemplary operating state.

FIG. 6 exemplarily shows, how the transition 16 can be avoided by corresponding actuation of the cover segments 5. One or more cover segments 5 in the transition area 16 between the first color area 14 and the second color area 15 are switched into an opaque state. Thus, a dark intermediate area 17 arises. The intermediate area 17 shines with lower intensity than the adjacent color areas 14, 15. The opacity of the one or the multiple cover segments 5 in the intermediate area 17 is adjusted greater than the opacity of cover segments 5 in the adjacent color areas 14, 15.

Overall, the examples show, how a method for a clear delimitation between LED segments can be provided in a light band by means of a switchable foil.

The invention claimed is:

1. A motor vehicle lighting device comprising:
   a lighting element comprising a plurality of light sources, the plurality of light sources being linearly arranged in a direction orthogonal to a light emitting direction;
   a cover element comprising a plurality of cover segments, wherein the cover element is configured to change between a transparent operating state and an opaque operating state,
      wherein, in a transition area, each of the plurality of cover segments is individually actuated respectively to the transparent operating state and the opaque operating state,
      wherein starting from a first side of the transition area to a second side of the transition area, each of the plurality of cover segments is actuated with an increasing opacity and a decreasing transparency, and
      wherein starting inversely from the second side of the transition area to the first side of the transition area, each of the plurality of cover segments is actuated inversely with a decreasing opacity and an increasing transparency; and
   a light guiding element configured to guide light emitted by the plurality of light sources from first coupling surfaces of the light guiding element to second coupling surfaces of the light guiding element, the second coupling surfaces being opposite to the first coupling surfaces in the light emitting direction,
      wherein the light guiding element is continuous without division into chambers, and is optically coupled to each of the plurality of light sources at the first coupling surfaces,
      wherein the light guiding element is optically coupled to each of the plurality of cover segments at the second coupling surfaces,
      wherein each light source is individually associated with one respective cover segment to cause the light guiding element to guide the light emitted by each light source to the one respective cover segment, providing a one-to-one association between each light source and the one respective cover segment, and
      wherein the second coupling surfaces are each larger than the first coupling surfaces.

2. The motor vehicle lighting device of claim 1,
   wherein the plurality of light sources are linearly arranged, and
   wherein each light source of the plurality of light sources is arranged adjacent to at most two light sources.

3. The motor vehicle lighting device of claim 1, wherein the cover element overlaps all of the plurality of light sources in a main emission direction of the motor vehicle lighting device.

4. The motor vehicle lighting device of claim 1, wherein the cover element is laminated onto a protective element.

5. The motor vehicle lighting device of claim 1, wherein the light guiding element is formed by at least one of a non-transparent material, or a translucent material.

6. The motor vehicle lighting device of claim 1, wherein the plurality of light sources and the plurality of cover segments are actuated by at least one of a common circuit board or a common cable harness.

7. The motor vehicle lighting device of claim 1, wherein each of the plurality of cover segments is electrically insulated from each other.

8. The motor vehicle lighting device of claim 1, wherein the plurality of light sources is at least three light sources.

9. The motor vehicle lighting device of claim 1, wherein the one-to-one association between each light source and the one respective cover segment provides a plurality of one-to-one associations between the lighting element and the cover element,
   wherein each of the plurality of one-to-one associations is mutually separate from another one of the plurality of one-to-one associations.

10. A motor vehicle comprising:
   a motor vehicle interior equipment, wherein the motor vehicle interior equipment is configured to arrange a motor vehicle lighting device, the motor vehicle light device comprising:
      a lighting element comprising a plurality of light sources, the plurality of light sources being linearly arranged in a direction orthogonal to a light emitting direction;
      a cover element comprising a plurality of cover segments,
         wherein the cover element is configured to change between a transparent operating state and an opaque operating state,
         wherein, in a transition area, each of the plurality of cover segments is individually actuated respectively to the transparent operating state and the opaque operating state,
         wherein starting from a first side of the transition area to a second side of the transition area, each of the plurality of cover segments is actuated with an increasing opacity and a decreasing transparency, and
         wherein starting inversely from the second side of the transition area to the first side of the transition area, each of the plurality of cover segments is actuated inversely with a decreasing opacity and an increasing transparency; and
      a light guiding element configured to guide light emitted by the plurality of light sources from first coupling surfaces of the light guiding element to second coupling surfaces of the light guiding element, the second coupling surfaces being opposite to the first coupling surfaces in the light emitting direction, wherein the light guiding element is continuous without division into chambers, and is optically coupled to each of the plurality of light sources at the first coupling surfaces, wherein the light guiding element is optically coupled to each of the plurality of cover segments at the second coupling surfaces, wherein each light source is individually associated with one respective cover segment to cause the light guiding element to guide the light emitted by each light source to the one respective cover segment, providing a one-to-one association between each light source and the one respective cover segment, and wherein the second coupling surfaces are each larger than the first coupling surfaces.

11. The motor vehicle according to claim 10, wherein the motor vehicle lighting device extends at least across 70 percent of a width of the motor vehicle.

12. The motor vehicle of claim 10, wherein each of the plurality of cover segments is electrically insulated from each other.

13. The motor vehicle of claim 10, wherein the plurality of light sources is at least three light sources.

14. A method for operating a motor vehicle lighting device comprising:

changing a cover element between a transparent operating state and an opaque operating state;

individually actuating, in a transition area, a plurality of cover segments of the cover element respectively to the transparent operating state and the opaque operating state, wherein starting from a first side of the transition area to a second side of the transition area, actuating each of the plurality of cover segments with an increasing opacity and a decreasing transparency, and wherein starting inversely from the second side of the transition area to the first side of the transition area, inversely actuating each of the plurality of cover segments with a decreasing opacity and an increasing transparency;

guiding, by a light guiding element, light emitted by a plurality of light sources from first coupling surfaces of the light guiding element to second coupling surfaces of the light guiding element, the plurality of light sources being linearly arranged in a direction orthogonal to a light emitting direction, and the second coupling surfaces being opposite to the first coupling surfaces in the light emitting direction, wherein the second coupling surfaces are each larger than the first coupling surfaces;

optically coupling, at the first coupling surfaces, the light guiding element to each of the plurality of light sources, wherein the light guiding element is continuous without division into chambers; and optically coupling, at the second coupling surfaces, the light guiding element to each of the plurality of cover segments, wherein each light source is individually associated with one respective cover segment to cause the light guiding element to guide the light emitted by each light source to the one respective cover segment, providing a one-to-one association between each light source and the one respective cover segment.

15. The method of claim 14, wherein each of the plurality of cover segments is electrically insulated from each other.

16. The method of claim 14, wherein the plurality of light sources is at least three light sources.

17. The method of claim 14, wherein the one-to-one association between each light source and the one respective cover segment provides a plurality of one-to-one associations between the plurality of light sources of a lighting element and the cover element, wherein each of the plurality of one-to-one associations is mutually separate from another one of the plurality of one-to-one associations.

* * * * *